United States Patent
Jachalsky et al.

(10) Patent No.: US 8,443,025 B2
(45) Date of Patent: May 14, 2013

(54) METHOD AND APPARATUS FOR SELECTIVELY REDUCING NOISE IN A DIGITAL SIGNAL

(75) Inventors: Joern Jachalsky, Hannover (DE); Malte Borsum, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 887 days.

(21) Appl. No.: 12/450,746

(22) PCT Filed: Apr. 8, 2008

(86) PCT No.: PCT/EP2008/054221
§ 371 (c)(1),
(2), (4) Date: Oct. 9, 2009

(87) PCT Pub. No.: WO2008/125545
PCT Pub. Date: Oct. 23, 2008

(65) Prior Publication Data
US 2010/0049778 A1 Feb. 25, 2010

(30) Foreign Application Priority Data
Apr. 12, 2007 (EP) .................................. 07106083

(51) Int. Cl.
*G06F 17/10* (2006.01)
(52) U.S. Cl.
USPC ........................................................ 708/300
(58) Field of Classification Search ........... 708/300–323
See application file for complete search history.

(56) References Cited

U.S. PATENT DOCUMENTS 6,216,145 B1 * 4/2001 Zandi et al. .................. 708/400
2006/0222254 A1 * 10/2006 Zandi et al. .................. 382/240

OTHER PUBLICATIONS

M. Jansen at al: "Image d-noising by integer wavelet transforms and generalized cross validation" Medical Physics, vol. 26, No. 4, Apr. 1999, pp. 622-630.
M. Grangetto et al.: "Lifting integer wavelets towards linearity" Conference Record of the Thirty-Third Asilomar Conference on Signals, Systems, and Computers, Pacific Grove, CA US, Oct. 24-27, 1999, vol. 2, Oct. 24, 1999, pp. 1647-1651.
Y. Suhail et al: "A reduced complexity integer lifting wavelet-based module for real-time processing in implantable neural interface devices" Proceedings of the $26^{TH}$ Annual International Conference of the IEEE Engineering in Medicine and Biology Society, San Francisco, CA US, Sep. 1-5, 2004, vol. 6, 2004, pp. 4552-4555.
A.A. Abdel-Raouf et al: "Real-time fixed point denoising of ultrasound data" Proceedings of the ISCA $17^{TH}$ International Conference on Computers and Their Applications, San Francisco, CA. US, Apr. 4-6, 2002, pp. 245-247.
Search Report Dated Jun. 23, 2008.

* cited by examiner

*Primary Examiner* — Tan V. Mai
(74) *Attorney, Agent, or Firm* — Jeffrey D. Carter (57) ABSTRACT

Wavelet thresholding using discrete wavelet transforms is a sophisticated and effective approach for noise reduction. However, usage of integer arithmetic implies that not the full range of input values can be used. A method for selectively reducing noise in a digital signal having a first range of values comprises steps of decomposing the digital signal to a plurality of frequency sub-bands, wherein before, during or after the decomposing the digital signal or at least one sub-band is expanded by one or more bits to a second range of integer values, removing in at least one of the frequency sub-bands values that are below a threshold, re-combining the frequency sub-bands, after removing said values that are below a threshold, into an expanded output signal, and de-expanding the expanded output signal, wherein a signal having the first range of values is obtained.

13 Claims, 5 Drawing Sheets

METHOD AND APPARATUS FOR SELECTIVELY REDUCING NOISE IN A DIGITAL SIGNAL

This application claims the benefit, under 35 U.S.C. §365 of International Application PCT/EP2008/054221, filed Apr. 8, 2008, which was published in accordance with PCT Article 21(2) on Oct. 23, 2008 in English and which claims the benefit of European patent application No. 07106083.4, filed Apr. 12, 2007.

FIELD OF THE INVENTION

This invention relates to a method and an apparatus for selectively reducing noise in a digital signal. In particular, the method and apparatus are based on using integer arithmetic.

BACKGROUND

Wavelet thresholding is a sophisticated and effective approach for noise reduction. Thereby, wavelet transformations allow a finely graduated thresholding of the wavelet coefficients, resulting in a finely graduated noise reduction, which in most cases is the goal for noise reduction applications. Wavelet transformations are usually calculated using floating-point arithmetic.

Figure 1:
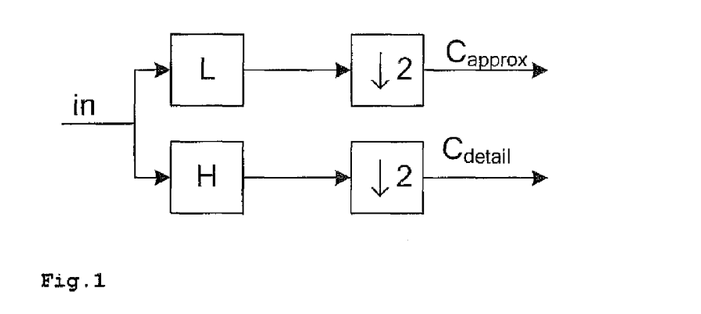

For wavelet thresholding a wavelet decomposition of the input data is performed. For digital input data, this is done with the discrete wavelet transform (DWT), which can be realized with filter banks. Thereby, each cascading step is called a level. The DWT decomposes the input data into approximation and detail coefficients. FIG. 1 shows a simple one dimensional DWT with a low-pass filter L, a high-pass filter H and subsequent downsampling stages.

Figure 2:
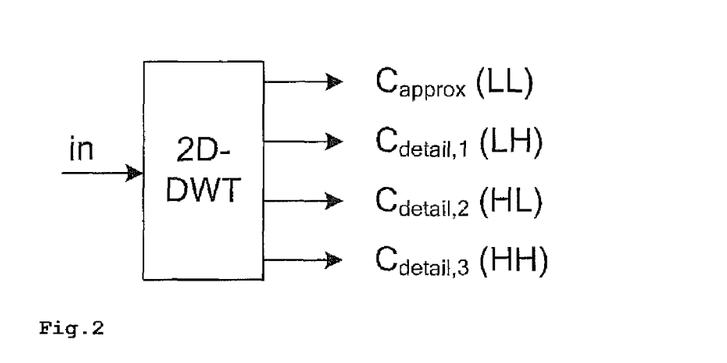
FIG. 2 a 2-dimensional DWT.

A two-dimensional DWT can be realized with one-dimensional DWTs by applying a row-column separation. Furthermore, the wavelet decomposition can be iterated resulting into a multi-level decomposition. FIG. 2 shows the wavelet decomposition for a 2D-DWT resulting in four sub-bands LL, LH, HL, HH. Sub-band LL contains the approximation coefficients, the other sub-bands detail coefficients.

Figure 3:
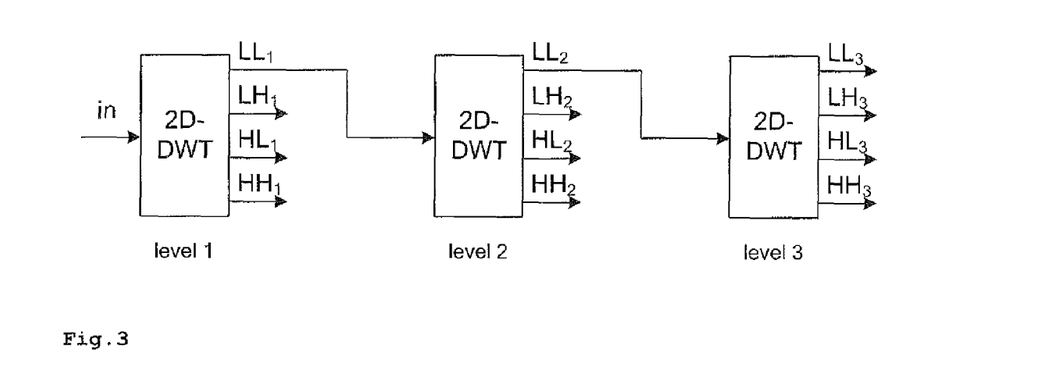
FIG. 3 multi-level decomposition for wavelet analysis using 2D-DWT.

FIG. 3 depicts a multi-level decomposition for a wavelet analysis based on a 2D-DWT, in which sub-band LL (i.e. approximation coefficients) of a level i is the input for the next level i+1. FIG. 3 shows three such levels.

Subsequent to the decomposition, the thresholding or shrinking of the detail wavelet coefficients (for 2D-DWT: e.g. $LH_i, HL_i, HH_i$ with i=1,...,N) is performed depending on the assigned noise model. This—in principle—leads to the reduction of noise. Thereby, the values of the wavelet coefficients w are modified based on a given threshold value T into resulting wavelet coefficients $W_T$. There are certain established thresholding techniques. Amongst others these are hard-thresholding, soft-thresholding and other, more sophisticated thresholding-techniques, e.g. Zhang (Zhang, X.-P. and Desai, M. D.: Adaptive denoising based on SURE risk. In: IEEE Signal Processing Letters, 1998, vol. 5, no. 10, pp. 265-267).

Figure 4:
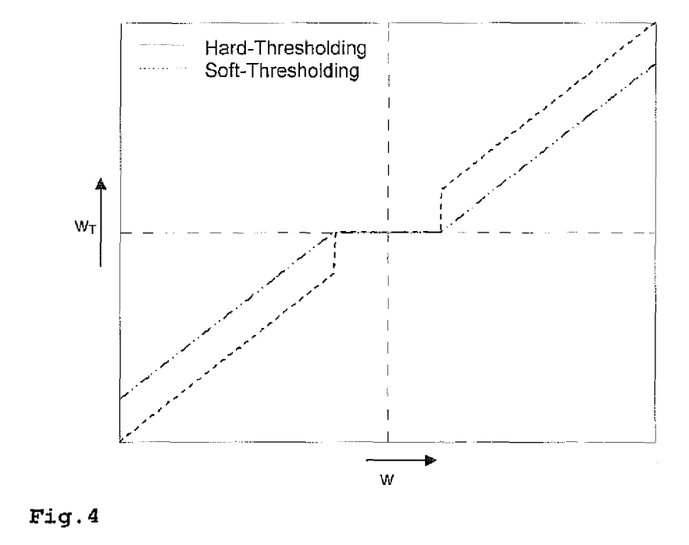
FIG. 4 different thresholding techniques.

The following equations and FIG. 4 further describe the hard- and soft-thresholding techniques.

$$w_{T,hard} = \begin{cases} w, & |w| > T \\ 0, & |w| \le T \end{cases} \quad \text{(Eq. 1.1)}$$

$$w_{T,soft} = \begin{cases} w - T, & w \ge T \\ w + T, & w \le -T \\ 0, & |w| < T \end{cases} \quad \text{(Eq. 1.2)}$$

The straight-forward hard-thresholding benefits from the precision that floating-point arithmetic provides, as a finely graduated selection of the threshold value T is possible and therefore it can precisely be defined which wavelet values are to be set to zero. Soft-thresholding or further sophisticated thresholding-techniques also prune or otherwise reduce the wavelet coefficients, e.g. w-T. Consequently, with floating-point arithmetic also a finely graduated pruning is possible.

The use of floating-point arithmetic requires the use of architectures and/or processing platforms that support floating-point arithmetic. This can be considered to be at least expensive, and even inefficient for hardware (HW) processing platforms like FGPAs or certain digital signal processors. In order to circumvent this restriction, some wavelet transformations make use of filter coefficients that allow a processing in fixed-point arithmetic at a precision equal to floating-point arithmetic. Fixed-point arithmetic in general requires a growing precision for each level of the wavelet decomposition tree, which easily exceeds the usually available 16 or 32 bit. Consequently, those methods are also not efficient or even not applicable for those kinds of platforms.

A further solution is the use of an integer wavelet transform (IWT), which allows a mapping of integer input values to integer output values. The processing in between needs not necessarily be based on integer arithmetic. In addition, with the selection of special filter coefficients that allow a processing with integer arithmetic, the entire processing including the thresholding can be performed in integer arithmetic. Thereby, with the resulting integer wavelet coefficients a finely graduated thresholding including pruning is not possible, as the finest achievable graduation is the precision that integer arithmetic provides. Consequently, the processing has to rely on a less finely or even coarsely graduated thresholding, as e.g. a pruning in the decimal places is not supported. The coarsely graduated thresholding even remains if floating-point arithmetic is used for the in-between processing of the IWT.

One example, which allows the fixed-point approach as well as an IWT calculation completely with integer arithmetic, is the lifting implementation of the 5-tap/3-tap filter by Le Gall[1,2]. The equations for the lifting scheme for the one dimensional 5-tap/3-tap filter are shown below, where y(2n) (Eq. 2.1) represents the output of the high-pass and y(2n+1) (Eq. 2.2) the output of the low-pass.

[1] Le Gall, D. & Tabatabai, A.: Sub-band coding of digital images using symmetric short kernel filters and arithmetic coding techniques. In: *International Conference on Acoustics, Speech and Signal Processing*, 1988, pp. 761-764 vol. 2
[2] Skodras, A. et al. *The JPEG 2000 still image compression standard*. In: *Signal Processing Magazine, IEEE*, 2001, vol. 18, no. 5, pp. 36-58

$$y(2n+1) = x(2n+1) - \left\lfloor \frac{x(2n) + x(2n+2)}{2} \right\rfloor \quad \text{(Eq. 2.1)}$$

$$y(2n) = x(2n) + \left\lfloor \frac{y(2n-1) + y(2n+1) + 2}{4} \right\rfloor \quad \text{(Eq. 2.2)}$$

Taking the fixed-point approach above, for an input of 10 bit signed, the coefficients y(2n+1) are 12 bit signed and the coefficients y(2n) are 14 bit signed. Respective word widths are required for the processing steps of the calculation. With a simple approximation, namely 4-bit width increase for the low-pass and 2-bit increase for the high-pass, the required precision for a multi-level 2D-DWT can be estimated. For the first level, the coefficients of the sub-band $LL_1$ require a word width of 18 bits, for the second level the coefficients of sub-band $LL_2$ require 26 bits and for the third level the coefficients of sub-band $LL_3$ require 34 bits.

SUMMARY OF THE INVENTION

A problem to be solved is how to achieve a finely graduated wavelet thresholding using integer arithmetic with minimal precision (with respect to the required word width, i.e. precision of calculation), wherein overflow is to be prevented.

This problem is solved by the method recited by the appended claims. A corresponding apparatus that utilizes the method is also recited by the appended claims.

The present invention applies a range expansion to the input values before, during and/or after the transform steps, then the thresholding and then an inverse expansion before, during and/or after the transform steps, wherein the transform steps use integer arithmetic. Thus, also the thresholding works on integer values, and is therefore easier to implement than conventional thresholding. In the thresholding, the integer coefficients are compared with appropriate thresholds which may also be integers.

Two basic embodiments are described that achieve a finely graduated wavelet thresholding using integer arithmetic with minimal processing precision.

According to one aspect of the present invention, a method for selectively reducing noise in a digital signal having a first range of values comprises the steps of decomposing the digital signal to a plurality of frequency sub-bands and expanding the digital signal or at least one of said frequency sub-bands by one or more bits before, during or after the step of decomposing, wherein at least one expanded frequency sub-band having a higher range of integer values than the first range of integer values is obtained, reducing (in terms of absolute value) or removing in at least one expanded frequency sub-band values that are below a threshold, and reconstructing from the frequency sub-bands, after said step of reducing or removing in the at least one expanded frequency sub-band the values that are below a threshold, an output signal having the first range of values, wherein the at least one expanded frequency sub-band or the reconstructed output signal is de-expanded.

According to another aspect of the present invention, an apparatus for selectively reducing noise in a digital signal having a first range of values comprises means for decomposing the digital signal to a plurality of frequency sub-bands and means for expanding the digital signal or at least one of said frequency sub-bands by one or more bits before, during or after the decomposing, wherein at least one expanded frequency sub-band having a higher range of integer values than the first range of integer values is obtained, means for reducing or removing in at least one expanded frequency sub-band values that are below a threshold, and means for reconstructing from the frequency sub-bands, including the at least one expanded frequency sub-band, an output signal having the first range of values, wherein the apparatus comprises means for de-expanding the at least one expanded frequency sub-band or the reconstructed output signal.

In a first basic embodiment, a pre-processing step is introduced in which the range of the input values is expanded to the level of precision required for the thresholding. Thereby, the values are distributed over the expanded value range.

In a second basic embodiment, a distributed range expansion is applied during the processing. This can be obtained by omitting the necessary division (by 2 and 4 in Eq. 2.1 and 2.2) for fractional coefficients and adjusting the other coefficients accordingly, thus selectively introducing fixed-point precision. This is utilized in some or all stages until the required precision is achieved. This expands the range of the resulting or intermediate wavelet coefficients. With this range expansion obtained within the pre-processing step or distributed over the processing, a higher precision is achieved which allows for a finely graduated thresholding. After the inverse transformation this range expansion is undone by corresponding compression or de-expansion.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a 1-dimensional DWT.

DETAILED DESCRIPTION OF THE INVENTION

While in the following the 5-tap/3-tap filter is taken as a reference example, the invention applies also to other means for decomposition (also called analysis) and means for reconstruction (also called composition or synthesis).

Figure 7:
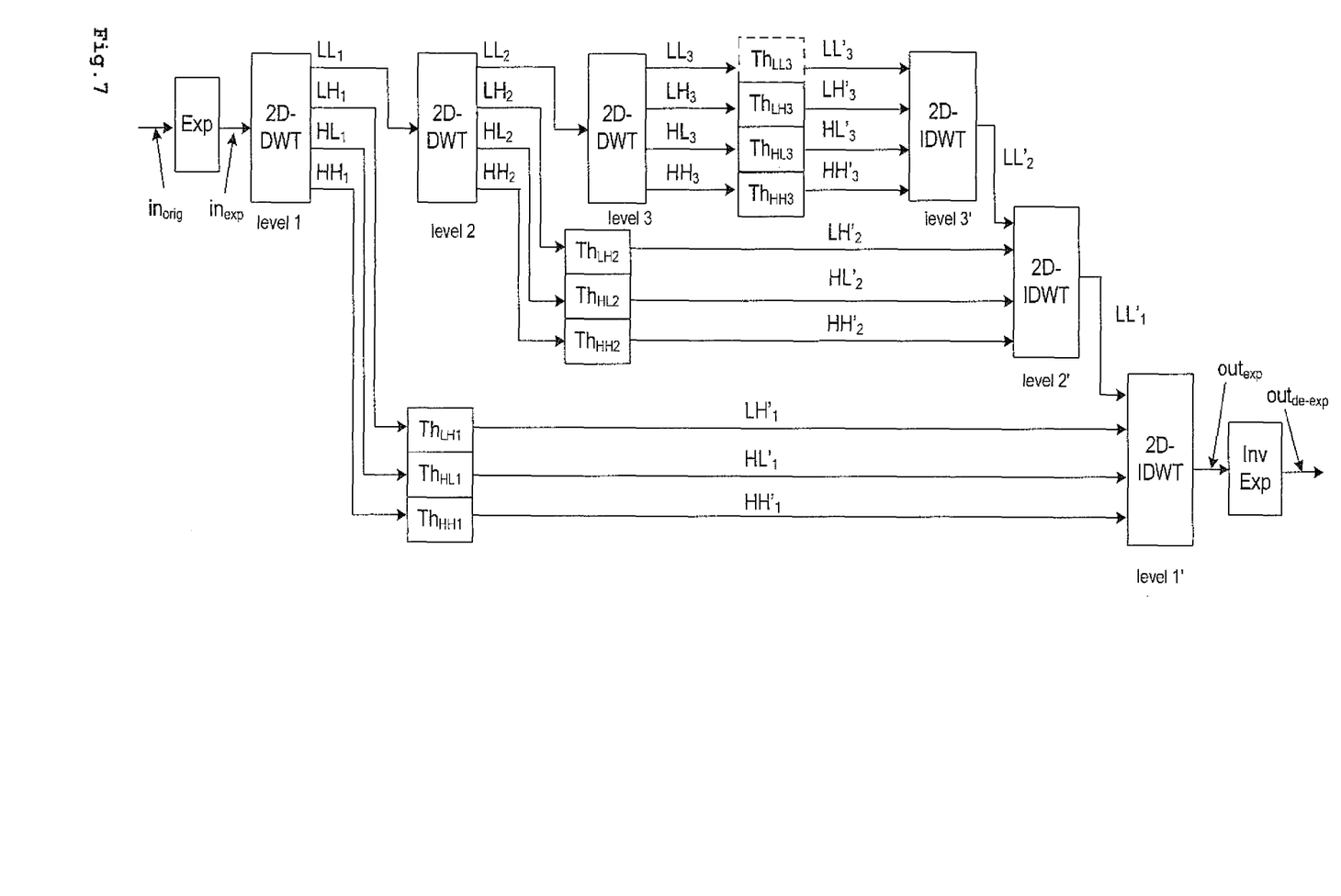
FIG. 7 the decomposition and composition part of a wavelet filter according to a first embodiment of the invention.

FIG. 7 shows a wavelet filter bank based on multi-level decomposition and composition, where the input values $in_{orig}$ are expanded by an expand function Exp which results in expanded input values $in_{exp}$. The expanded input values $in_{exp}$ are used for the decomposition stage 2D-DWT, which is a discrete wavelet transform in this case. To the output values of each sub-band of each level, thresholding functions $Th_{LH1}$, $Th_{HL1}$, ..., $Th_{HH3}$ are applied to remove (or at least reduce in terms of absolute value) coefficients that are below the respective threshold. These represent usually mainly noise, assuming that the thresholds are properly set. Thus, the noise is cancelled. Also small coefficients coming from the original signal are removed, but these are irrelevant since they cannot be distinguished from the noise.

In this particular example, the thresholds used by the thresholding blocks $Th_{LH1}$, $Th_{HL1}$, $Th_{HH1}$ applied to the first decomposition level may be all different, and may be different from those of the thresholding blocks $Th_{LH2}$, $Th_{HL2}$, $Th_{HH2}$ applied to the second decomposition level and those of the thresholding blocks $Th_{LL3}$, $Th_{LH3}$, $Th_{HL3}$, $Th_{HH3}$ applied to the third decomposition level. The thresholds may however be independent from each other, and may thus be equal. They may be defined by any adequate method, e.g. generalized cross validation.

After the expansion, wavelet decomposition and selective thresholding, the signal is reconstructed from the resulting sub-bands. The coefficients of the sub-bands are fed into an inverse discrete wavelet transform (IDWT) 2D-IDWT, which is complementary to the previously used DWT and therefore 2-dimensional in this case. Thus, a perfect reconstruction of the input signal is generally possible (assuming that DWT and IDWT blocks meet the well-known perfect reconstruction conditions), except where spectral components below the respectively applied thresholding have been removed.

In a final stage, the range of the IDWT output values $out_{exp}$ is re-mapped to the original range of values by an inverse expansion InvExp, resulting in reconstructed, de-expanded output values $out_{de-exp}$ that contain reduced noise.

It is a particular advantage of the invention that all the processing steps can be executed using integer arithmetic. Due to the range expansion, the available value range for the processing can be fully utilized even if the range of input values is smaller. In particular, the range expansion can be selectively applied to certain frequency bands of the signal, as further described below, so that selective noise reduction can be performed.

It is clear that while in this example a 2-dimensional DWT decomposition is used, it may also be 1-dim or 3-dim or any other type of signal decomposition. Further, thresholding needs not be applied to all sub-bands of any decomposition level, and not to all decomposition levels. The thresholding may also be applied only to frequency bands where noise is mainly expected, e.g. in FIG. 7 $LH_1$, $HL_1$, $HH_1$, and $HH_2$ as being the four most detailed coefficients. Particularly in the lowest sub-band $LL_3$, thresholding is normally skipped. Generally, it depends on the frequency spectrum of the signal and of the expected noise in which sub-bands thresholding are used. In programmable architectures, the thresholds can be individually set, and thresholding can be skipped by setting the threshold to zero. According to the invention, the values to which the thresholds are applied are all integers. Thus, the thresholds themselves may, but need not be integers.

The invention utilizes a range expansion applied to the values to be processed, either prior to the processing or dynamically (distributed) during the processing or both, in order to allow a finely graduated thresholding of the wavelet coefficients. Thereby, the required processing precision, i.e. the finest graduation required, is adapted selectively to the available processing architecture. The required precision depends on the application that needs noise reduction, e.g. image processing.

In order to determine the minimum required precision, the inherent range expansion, which can be caused by the characteristics of the applied filters (e.g. the overshoot), has to be taken into account. For the 5-tap/3-tap filter, this can be roughly estimated to be 2 bit for the first three levels for signed input values. For the example above with 10-bit signed input values, the output coefficients of the third level require 12 bit for the calculation of the IWT. Therefore, e.g. for a 16-bit integer arithmetic 4 bit are available to increase the thresholding precision. For 9-bit signed these are 5 bit and so on. For 24-bit or 32-bit integer arithmetic there are more bits available to increase the thresholding precision.

In the following, the number of bits used to increase the thresholding precision is denoted with k. For embodiments where the range expansion is performed prior to the processing, the range of the input values having a width of n bit is expanded by k bit into a resulting word width of k+n bit.

Thereby, several expansion schemes are possible. Two range expansion schemes are described in the following.

Figure 5:
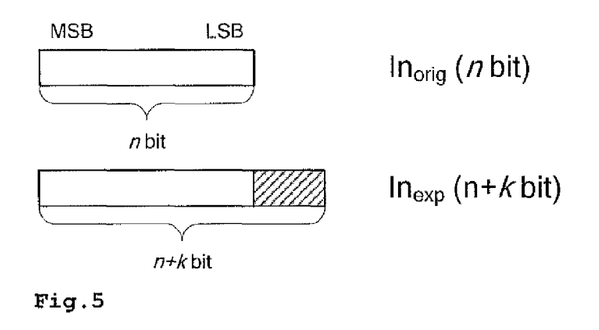
FIG. 5 a simple range expansion.

A first scheme (proposed scheme 1) is based on a simple bit shift, as shown in FIG. 5. In this case, k bits are appended that all have the value 0. This may also be described as a multiplication with $2^k$ or a logical bit shift by k:

$$x_{S2} = x * 2^k \qquad \text{(Eq. 3.1)}$$

$$x_{S2} = x << k \qquad \text{(Eq. 3.2)}$$

Obviously, the resulting expanded values are not evenly distributed, since their k least significant bits (LSBs) are all zero.

This range expansion can be inverted by a logical bit shift by −k, truncating the k LSBs and rounding the result to the nearest integer. E.g. if a value of $010001_{bin}$ is to be de-expanded by 2 bits, the intermediate result is $0100.01_{bin}$ which is rounded to $0100_{bin}$, whereas for a value of $010010_{bin}$ the intermediate result is 0100.10 which is rounded to $0101_{bin}$.

This first scheme is very easy to implement, and can be executed very fast.

Figure 6:
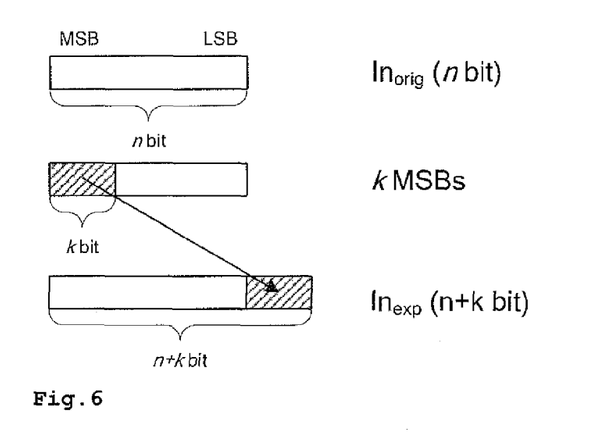
FIG. 6 a second range expansion technique.

A second scheme (proposed scheme 2) allows for a more even distribution of the original input values over the new range of n+k bit. This scheme is particularly advantageous for unsigned integer input values, which is the case e.g. in image processing. Provided that k<=n, the k most significant bits (MSBs) of the n original bits are inserted at the LSB position after the shift of k bits. FIG. 6 depicts this second scheme.

E.g. if values of $0100101_{bin}$, $0110110_{bin}$ and $0001010_{bin}$ are to be expanded by 3 bits, the results are $0100101\underline{010}_{bin}$, $0110110\underline{011}_{bin}$ and $0001010\underline{000}_{bin}$ since the 3 $\overline{\text{MSBs}}$ are appended (as underlined). This scheme has the advantage that the resulting expanded values are more evenly distributed. For signed integer input values the processing is in principle the same, however in the case of a signed value the MSB may be omitted in order to achieve different values.

This scheme can be easily implemented in hardware. In the case that k>n, the MSBs of the n bit can be replicated until n+m is equal to k. E.g. expansion of the 4-bit value $1011_{bin}$ by 6 bits results in $1011101110_{bin}$. Moreover, this proposed scheme 2 can be universally applied for achieving a more even distribution in the expansion of data sets to a higher data range. For the de-expansion, the respective MSBs (irrespective of their particular value) that were added during expansion need to be subtracted. E.g. if the two MSBs of an input value were added during expansion, then the two MSBs of the resulting value need to be subtracted during the de-expansion.

In the following, the above-described schemes are compared to three conventional schemes for the case k<=n with k=4 and n=8. The reference is an exact even distribution, which however would require floating-point arithmetic:

$$x_{ex} = x * \frac{4095}{255} \qquad \text{(Eq. 4)}$$

The first conventional scheme Ref1 uses rounding, the second conventional scheme Ref2 the floor-function and the third conventional scheme Ref3 the ceiling-function:

$$x_{ex,1} = \text{ROUND}(x_{ex}) \qquad \text{(Eq. 5)}$$

$$x_{ex,2} = \lfloor x_{ex} \rfloor$$

$$x_{ex,3} = \lceil x_{ex} \rceil$$

Tab. 1 lists the results of this comparison, in particular the achieved errors and the mean square errors (MSE).

TABLE 1

Comparison of different expansion schemes

| | $X_{ex} = X*$ | Ref1 | | Ref2 | | Ref3 | | Proposed Scheme 1 | | Proposed Scheme 2 | |
|---|---|---|---|---|---|---|---|---|---|---|---|
| X | 4095/255 | | Error | | Error | | Error | | Error | | Error |
| 0 | 0.00 | 0 | 0.00 | 0 | 0.00 | 0 | 0.00 | 0 | 0.00 | 0 | 0.00 |
| 1 | 16.06 | 16 | −0.06 | 16 | −0.06 | 17 | 0.94 | 16 | −0.06 | 16 | −0.06 |
| 2 | 32.12 | 32 | −0.12 | 32 | −0.12 | 33 | 0.88 | 32 | −0.12 | 32 | −0.12 |
| 3 | 48.18 | 48 | −0.18 | 48 | −0.18 | 49 | 0.82 | 48 | −0.18 | 48 | −0.18 |
| 4 | 64.24 | 64 | −0.24 | 64 | −0.24 | 65 | 0.76 | 64 | −0.24 | 64 | −0.24 |
| 5 | 80.29 | 80 | −0.29 | 80 | −0.29 | 81 | 0.71 | 80 | −0.29 | 80 | −0.29 |
| 6 | 96.35 | 96 | −0.35 | 96 | −0.35 | 97 | 0.65 | 96 | −0.35 | 96 | −0.35 |
| 7 | 112.41 | 112 | −0.41 | 112 | −0.41 | 113 | 0.59 | 112 | −0.41 | 112 | −0.41 |
| 8 | 128.47 | 128 | −0.47 | 128 | −0.47 | 129 | 0.53 | 128 | −0.47 | 128 | −0.47 |
| 9 | 144.53 | 145 | 0.47 | 144 | −0.53 | 145 | 0.47 | 144 | −0.53 | 144 | −0.53 |
| 10 | 160.59 | 161 | 0.41 | 160 | −0.59 | 161 | 0.41 | 160 | −0.59 | 160 | −0.59 |
| 11 | 176.65 | 177 | 0.35 | 176 | −0.65 | 177 | 0.35 | 176 | −0.65 | 176 | −0.65 |
| 12 | 192.71 | 193 | 0.29 | 192 | −0.71 | 193 | 0.29 | 192 | −0.71 | 192 | −0.71 |
| 13 | 208.76 | 209 | 0.24 | 208 | −0.76 | 209 | 0.24 | 208 | −0.76 | 208 | −0.76 |
| 14 | 224.82 | 225 | 0.18 | 224 | −0.82 | 225 | 0.18 | 224 | −0.82 | 224 | −0.82 |
| 15 | 240.88 | 241 | 0.12 | 240 | −0.88 | 241 | 0.12 | 240 | −0.88 | 240 | −0.88 |
| 16 | 256.94 | 257 | 0.06 | 256 | −0.94 | 257 | 0.06 | 256 | −0.94 | 257 | 0.06 |
| 17 | 273.00 | 273 | 0.00 | 273 | 0.00 | 273 | 0.00 | 272 | −1.00 | 273 | 0.00 |
| ... | | | | | | | | | | | |
| 255 | 4095.00 | 4095 | 0 | 4095 | 0 | 4095 | 0 | 4080 | −15.00 | 4095 | 0.00 |
| Min. Error | | | −0.47 | | −0.94 | | 0.00 | | −15.00 | | −0.88 |
| Max. Error | | | 0.47 | | 0.00 | | 0.94 | | 0.00 | | 0.88 |
| MSE | | | 0.083 | | 0.303 | | 0.303 | | 75.147 | | 0.147 |

E.g. for an input value of 16 that is expanded from 8 to 12 bit, a floating-point arithmetic would calculate with a value of 256.94 and all the integer methods would use 256 (where the error is −0.94) or 257 (where the error is 0.06) instead. However, the MSE is an important key factor and differs for the shown expansion schemes.

The proposed scheme 2 proofs to be superior to scheme Ref2 and Ref3 and comes close to scheme Ref1, which is more costly to implement. The proposed scheme 1, which achieves a less even distribution, has the advantage that it allows a rather easy implementation.

While the described first approach expands the values before decomposition and de-expands or compresses the values again after reconstruction, an alternative second approach is available, as already mentioned.

The second approach makes use of a distributed (or dynamic) range expansion. Thereby, the necessary division while calculating the coefficients are suppressed and thus fixed-point arithmetic to a certain level is introduced. For the lifting implementation of the 5-tap/3-tap filter, this leads to the following equations (cf. Eq. 2):

$$y(2n+1) = 2*x(2n+1) - (x(2n) + x(2n+2)) \quad \text{(Eq.6.1)}$$

$$y(2n) = 8*x(2n) + y(2n-1) + y(2n+1) \quad \text{(Eq. 6.2)}$$

Thereby, the range of the coefficients $y(2n+1)$ is expanded by 1 bit and the range of the coefficients $y(2n)$ by three bits in the decimal places. This second approach can be applied for each 1-dim DWT. Consequently, for each one-level 2D-DWT it can be selected whether the expansion for sub-band LL, which is the relevant sub-band for a multi-level wavelet analysis, is 6, 3 or 0 bit. For the sub-band HL this expansion is 4, 1 or 0 bit and for sub-band LH 4, 3 or 0 bit. Finally, the expansion of sub-band HH is 2, 1 or 0 bit. In contrast to the second embodiment, the range expansion can only be done in quantized steps. If the required range expansion is reached, e.g. 16 bit in the final inner stage, the enforced distributed expansion is simply turned off, i.e. subsequent decomposition stages include the division step again. This means that, although small range extension is still possible due to the filter architecture, this is already considered so that all processing is done with not more than the required range expansion, e.g. 16 bit.

It has again to be noted that instead of the original input values, the expanded input values are transformed. The resulting coefficients are thresholded and then the inverse transformation is performed. Finally, the introduced range expansion is undone by de-expanding (or compressing) the results.

Figure 8:
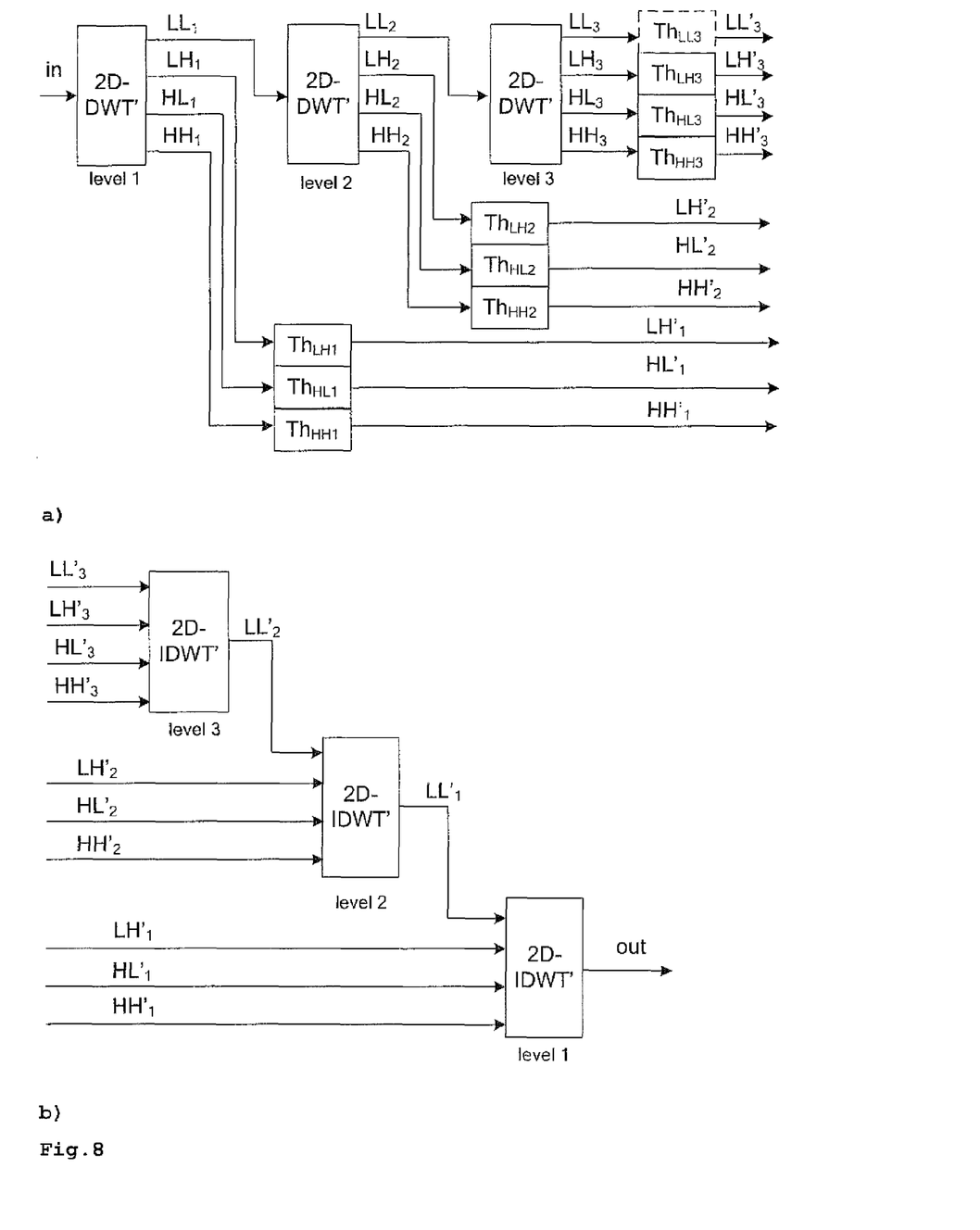
FIG. 8*a* the decomposition part of a wavelet filter according to a second embodiment of the invention.
FIG. 8*b* the composition part of a wavelet filter according to a second embodiment of the invention.

FIG. 8 shows an embodiment where the range expansion is distributed. Instead of the common DWT stages of FIG. 7, modified DWT stages 2D-DWT' are used that apply Eq.6 to the input values. The value expansion is done by omitting the division operation of Eq.2. Again, the thresholding Th'$_{LH1}$, Th'$_{HL1}$, ..., Th'$_{HH3}$ is done on the expanded values. The decomposition is reversed by reconstruction stages 2D-IDWT' that are complementary to the decomposition stages. Thus, a perfect reconstruction of the input signal is possible if all thresholds are set to zero. Thus the frequency spectrum of the output signal is not modified, compared to the input signal. However, some or all sub-bands or wavelets can be expanded in order to enable a finely graduated wavelet thresholding.

Figure 9:
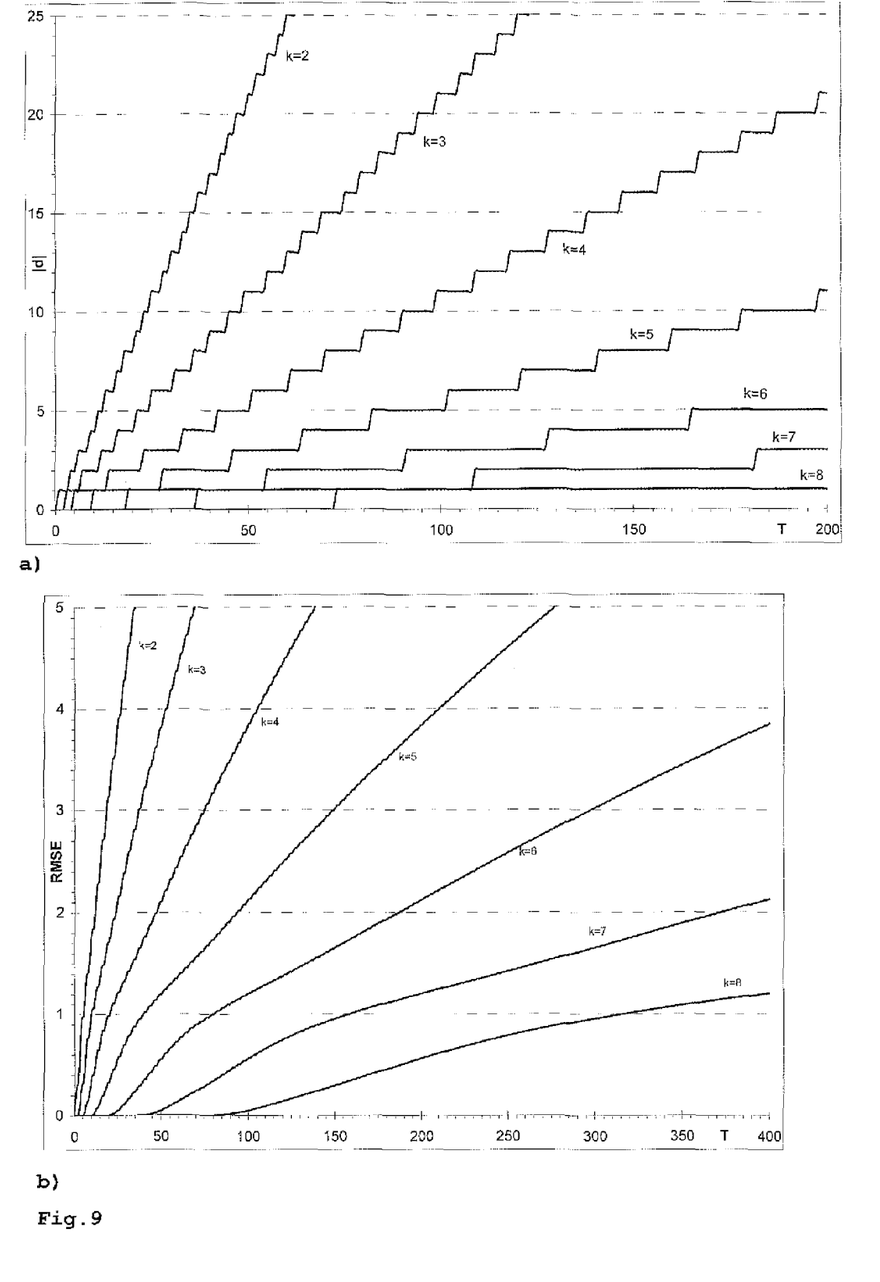
FIG. 9 the RMSE between processed and unprocessed data set using simple bit shift, depending on expansion width k and threshold value T.

For the 5-tap/3-tap filter, experiments show that with the range expansion a finely graduated wavelet thresholding is possible using integer arithmetic with minimal processing precision (or rather maximum usage of the available processing precision by value range expansion). With each expansion bit added, the wavelet thresholding becomes more finely graduated. Thereby, next to the maximum difference that can be observed between the original and the processed data set (e.g. image) it is important how many data items (e.g. pixels) are affected. The latter can be expressed e.g. by the root mean square error (RMSE) between processed and unprocessed data set. FIG. 9 shows the results for the first approach (i.e. bit shift and fill with zeros) with proposed expansion scheme 1 depending on the expansion width k and the threshold value T.

The input data width is 9 bit unsigned. The absolute maximum difference max(|d|) and the RMSE $$\left(\sqrt{\frac{1}{N}\sum_N d^2}\right)$$

are depicted.

The key advantages of the invention are the use of integer arithmetic for wavelet thresholding which allows the use of a wider class of architectures and processing platforms. Furthermore, the precision, i.e. the word width, for the processing can be minimized in comparison to fixed-point arithmetic. Both advantages, integer arithmetic and minimized precision requirements, can result into lower costs with an equal or similar thresholding quality. They allow a more efficient implementation and therefore the selection of smaller devices, or devices with less processing performance.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two.

Connections may, where applicable, be implemented as wireless connections or wired, not necessarily direct or dedicated, connections.

Reference signs appearing in the claims are by way of illustration only and shall have no limiting effect on the scope of the claims.

The invention claimed is:

1. A method for operating an apparatus to selectively reduce noise in a digital signal having a first range of values, the method comprising steps of:
   decomposing, via the apparatus, the digital signal to a plurality of frequency sub-bands using integer arithmetic and wavelet transform, and expanding, via the apparatus, the digital signal or at least one of the frequency sub-bands by one or more bits before, during or after the step of decomposing, wherein at least one expanded frequency sub-band having a higher range of integer values than the first range of integer values is obtained, and wherein the expanding is achieved either by adding one or more bits at a least significant bit (LSB) position and setting the added bit or bits to a value that is obtained from the digital signal, or by omitting a division operation for at least one frequency sub-band during the step of decomposing, and wherein, in the case of the expanding being achieved by adding one or more bits at the least significant bit (LSB) position, the value that is obtained from the digital signal is obtained from the most significant bits (MSBs) of the digital signal;
   automatically reducing or removing in at least one expanded frequency sub-band values that are below a threshold; and
   reconstructing from the frequency sub-bands, via the apparatus and after the step of reducing or removing in the at least one expanded frequency sub-band the values that are below a threshold, an output signal having the first range of values, wherein the at least one expanded frequency sub-band or the reconstructed output signal is de-expanded and wherein integer arithmetic is used.

2. The method according to claim 1, wherein separate thresholds are applied to more than one frequency sub-band, and wherein the threshold of each frequency sub-band can differ from the thresholds of other frequency sub-bands.

3. The method according to claim 1, wherein the one or more thresholds are integer thresholds.

4. The method according to claim 1, wherein, in the case of the expanding being achieved by omitting a division operation, the one or more expanding bits are added at the least significant bit (LSB) position and are set to zero, and the step of de-expanding comprises rounding to the nearest integer value.

5. The method according to claim 1, wherein the step of de-expanding the expanded output signal comprises removing the least significant bits.

6. The method according to claim 1, wherein the step of decomposing is performed by a digital wavelet transform and the step of reconstructing is performed by an inverse digital wavelet transform.

7. The method according to claim 1, wherein the expanding is achieved by omitting a division operation for the at least one frequency sub-band during the step of decomposing, and wherein the decomposing is performed according to:

$$y(2n+1)=2*x(2n+1)-(x(2n)+x(2n+2)) \text{ and/or}$$

y(2n)=8*x(2n)+y(2n−1)+y(2n+1), and wherein the expansion for the lowest frequency sub-band can be selected to be 6, 3 or 0 bit.

8. The method according to claim 7, wherein the decomposing is performed into four sub-bands LL, HL, LH and HH, and wherein the expansion is 4,1 or 0 bit for the sub-band HL, or the expansion is 4,3 or 0 bit for sub-band LH, or the expansion is 2,1 or 0 bit for sub-band HH.

9. An apparatus for selectively reducing noise in a digital signal having a first range of values, the apparatus comprising:
   means for decomposing the digital signal to a plurality of frequency sub-bands using integer arithmetic and wavelet transform;
   means for expanding the digital signal or at least one of the frequency sub-bands by one or more bits before, during or after the decomposition, wherein at least one expanded frequency sub-band having a higher range of integer values than the first range of integer values is obtained, and wherein the expanding is achieved either by adding one or more bits at a least significant bit (LSB) position and setting the added bit or bits to a value that is obtained from the digital signal, or by omitting a division operation for the at least one frequency sub-band during the decomposition, and wherein the means for expanding comprises means for adding one or more bits at the least significant bit (LSB) position, means for obtaining one or more bits of the digital signal, and means for setting the added one or more bits to the obtained one or more bits of the digital signal;
   means for reducing or removing in at least one expanded frequency sub-band values that are below a threshold; and
   means for reconstructing from the frequency sub-bands, including the at least one expanded frequency sub-band, an output signal having the first range of values, wherein the apparatus comprises means for de-expanding the at least one expanded frequency sub-band or the reconstructed output signal and wherein integer arithmetic is used.

10. The apparatus according to claim 9, wherein, in the case of the expanding being achieved by adding one or more bits at the least significant bit (LSB) position, the added value that is obtained from the digital signal is obtained from the most significant bits (MSBs) of the digital signal.

11. The apparatus according to claim 9, wherein the means for de-expanding the expanded output signal includes means for removing the least significant bits (LSBs).

12. The apparatus according to claim 9, wherein the expanding is achieved by omitting a division operation for the at least one frequency sub-band during the decomposition, and wherein the decomposition is performed according to $$y(2n+1)=2*x(2n+1)-(x(2n)+x(2n+2)) \text{ and/or}$$

y(2n)=8*x(2n)+y(2n−1)+y(2n+1), and wherein the expansion for the lowest frequency sub-band can be selected to be 6, 3 or 0 bit.

13. The apparatus according to claim 12, wherein the decomposing is performed into four sub-bands LL,HL, LH and HH, and wherein the expansion is 4,1 or 0 bit for the sub-band HL, or the expansion is 4,3 or 0 bit for sub-band LH, or the expansion is 2,1 or 0 bit for sub-band HH.

* * * * *